Figure 1:
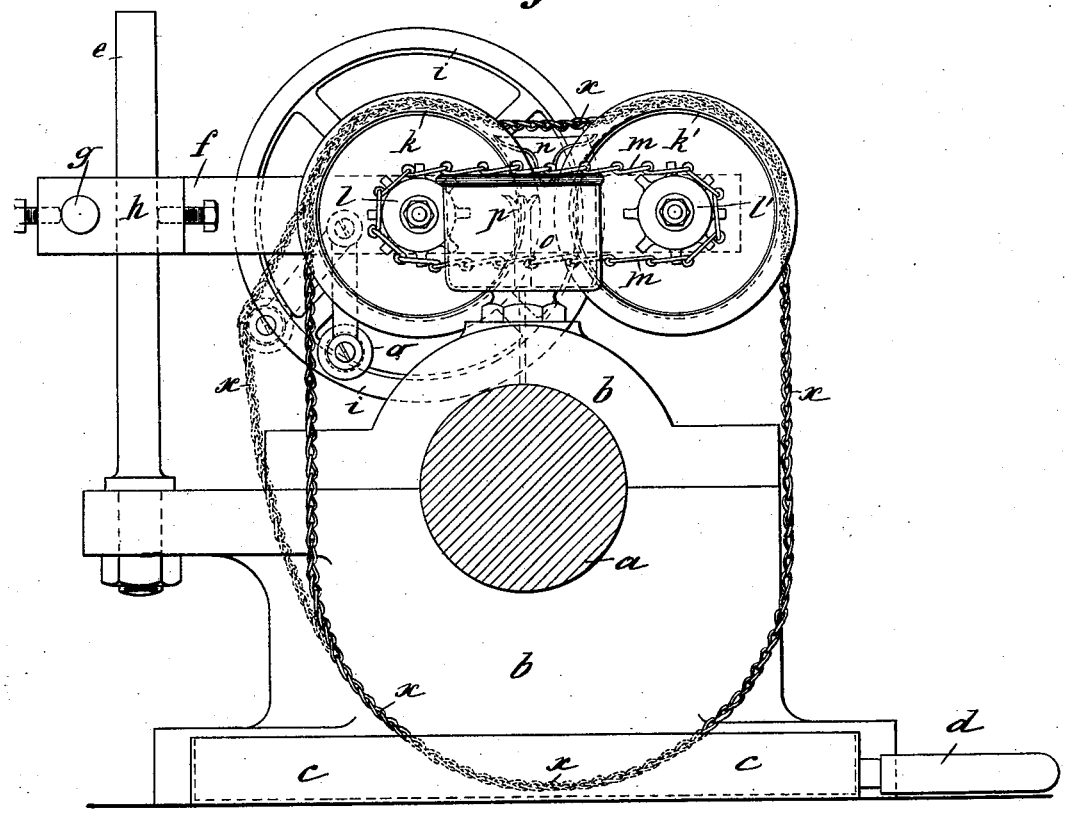

No. 688,396. Patented Dec. 10, 1901.
L. DEPIREUX.
BEARING LUBRICATOR.
(Application filed Mar. 20, 1900.)

(No Model.)

Witnesses
Harry A. Knight
Joe Dilkey

Inventor:
Louis Depireux.
By Knight Bros
Attys

UNITED STATES PATENT OFFICE.

LOUIS DEPIREUX, OF LIEGE, BELGIUM.

BEARING-LUBRICATOR.

SPECIFICATION forming part of Letters Patent No. 688,396, dated December 10, 1901.

Application filed March 20, 1900. Serial No. 9,440. (No model.)

*To all whom it may concern:*

Be it known that I, LOUIS DEPIREUX, mechanical engineer, a subject of the King of Belgium, residing at 84 Rue Douffet, Liege, in the Kingdom of Belgium, have invented new and useful Improvements in or Relating to Bearing-Lubricators, (for which applications have been filed in Belgium on the 1st of February, 1900; in France on the 3d of February, 1900; in Germany on the 5th of February, 1900; in England on the 6th of February, 1900, and in Russia on the 29th of February, 1900,) of which the following is a full, clear, and exact description.

The present invention relates to the automatic lubrication of bearings, and mainly consists in causing a lubricant-carrier, in the shape of a loop endless chain or carrier, to travel around the bearings to be lubricated and dip into a trough filled with oil or other lubricating material arranged below the shaft. In its passage the loop becomes charged with lubricant and raises it above the oil-cup provided on the bearing and discharges it into the oil-cup as it passes over. The device, which in the case of large bearings may consist of a series of cups or other suitable vessels articulated to each other or, in the case of smaller bearings, of a chain with suitably-arranged links being kept continually traveling around the shaft, provides a continuous and automatic lubrication and offers, above all, the great advantage that constant watching is not required and that any waste of lubricant can easily be avoided by judiciously arranging the trough containing the lubricant. Although the traveling of the chain may be effected in any suitable way, means have been devised in conformity with the present invention, as hereinafter described, and shown in the drawings, which are particularly applicable to most requirements.

Figure 2:
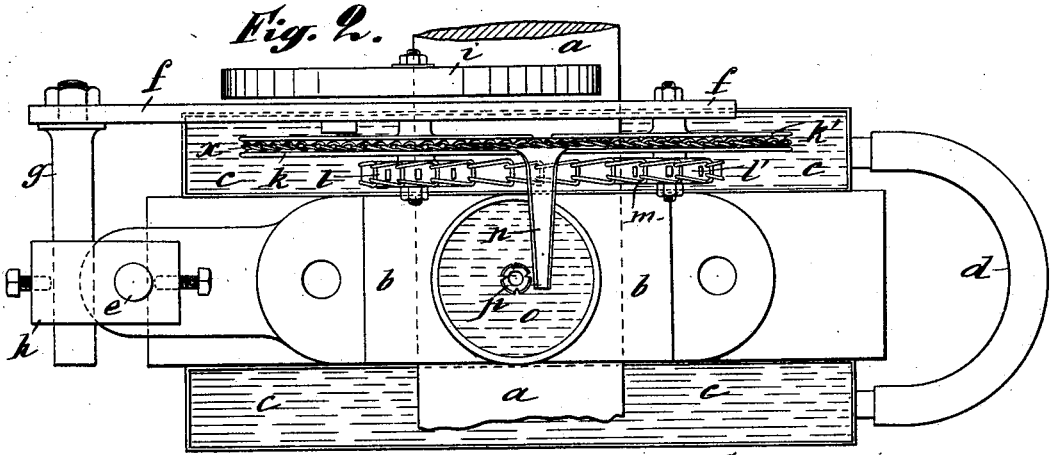

In the accompanying drawings, Figure 1 represents a side elevation of the lubricating device in combination with a shaft to be lubricated. Fig. 2 is a plan view of same.

In this arrangement, represented by way of example, $a$ indicates a shaft revolving in bearings $b$. At the sides of the base of the bearing is arranged a U-shaped trough or two troughs $c$, communicating with each other by a curved tube $d$ for the purpose of providing in a small space an excess of the quantity of lubricant required for a given length of time of work.

On an upright $e$, of suitable form and dimensions and arranged in any suitable manner on the bearing itself or in close proximity to it, is arranged a horizontal arm $f$, adjustable as to height by a set-screw, the horizontal position of which arm is regulated by another screw passing through a slide $h$, arranged on the upright $e$ and pressing against the rod $g$. The horizontal arm serves as a support, the mechanism serving for producing the movement of the chain. This mechanism consists in this chosen construction of a drive-wheel $i$, bearing against a rotating part, such as the journal to be lubricated, and receiving rotary motion therefrom and rigidly connected to and centered with a grooved vertical pulley $k$ and a chain-pinion $l$, these three connected members turning on a common pivot or pin in the horizontal arm $f$. At a certain distance from this pulley is arranged in the same manner another pulley $k'$, rigidly connected with a second chain-pinion $l'$, the two pinions $l$ $l'$, gearing with the links of an endless chain $m$, transmitting the movement from the first pinion to the other. Over the two grooved pulleys extends loosely an endless chain intended to carry the lubricant, for which purpose it dips with its lowest portion into the lubricant-trough $c$, while it drops or sags somewhat at the top between the pulleys $k$ $k'$ over a T-shaped gutter or collector $n$, one branch of which extends under the said portion of the chain $x$, while the other extends out sidewise over an oil-cup $o$, arranged over the center of the bearing $b$.

The working of this continuous and automatic lubricating device is as follows: The horizontal arm $f$ is lowered until friction contact is obtained between the rim of the wheel $i$ it carried and the main shaft $a$, the latter thus involving in its movement the said wheel and with it the movement of the pulleys and lubricating-chain $x$. It is evident also that this effect may be produced by other means than by simple frictional contact, such as by providing the rim of the wheel $i$ with teeth gearing with a corresponding pinion keyed on the shaft $a$, a modification which would be used in the case of very heavy machinery. The rotatory movement of the first pulley $k$ may in certain cases be transmitted to the other pulley $k'$ by the lubricating-chain $x$ alone; but this simplified modification cannot always be relied upon to insure a certain uniform movement of the chain. This risk is absolutely avoided by gearing the second pulley with the first by means of pinions $l\ l'$ and a chain $m$. The lubricant-chain $x$ in passing through the trough $c$ becomes charged with lubricant, which it continues to hold between the links as it travels in the ascending part of its course, but lets part of it fall as the links pass along the horizontal section between the two pulleys, the lubricant falling into the gutter $n$, which feeds the oil-cup $o$, in which the oil rises until it reaches the edge of a central vertical oiling-tube $p$, through which it reaches the shaft $a$. The top of this tube is slit and the tongues thus formed bent back, so as to form slots narrowing to a point through which the oil passes into the tube, while any impurities are kept back by the tongues.

In certain cases the chain $x$ may feed the oil-cup more rapidly than is required by the consumption, which fault may be readily remedied by providing a chain-tension roller $d$ on an arm pivoted on the horizontal arm $f$, so that it can be swung outward against, say, the ascending section of the chain in order to cause it to dip to a lesser extent into the oil, and consequently become less loaded with oil before the links arrive in the horizontal section of the course. Any excess of oil dropping off the chain, together with any excess not used in the bearing, finds its way back to the trough $c$, the consumption of the oil being thus reduced to a minimum, while there is always available an excess of lubricant.

Having now particularly described and ascertained the nature of my said invention and in what manner the same is to be performed, I declare that what I claim is—

In combination with an endless-chain lubricator and the support for the parts thereof, the slide $h$ upon which the support for the lubricating parts is horizontally adjustable, and the upright $e$ upon which said slide is vertically adjustable.

In witness whereof I have hereunto set my hand in presence of two witnesses.

LOUIS DEPIREUX.

Witnesses:
   AUG. WERISSEN,
   GREGORY PHELAN.